(No Model.)	2 Sheets—Sheet 1.
J. F. THOMPSON.
AGRICULTURAL MACHINE.
No. 483,026.	Patented Sept. 20, 1892.
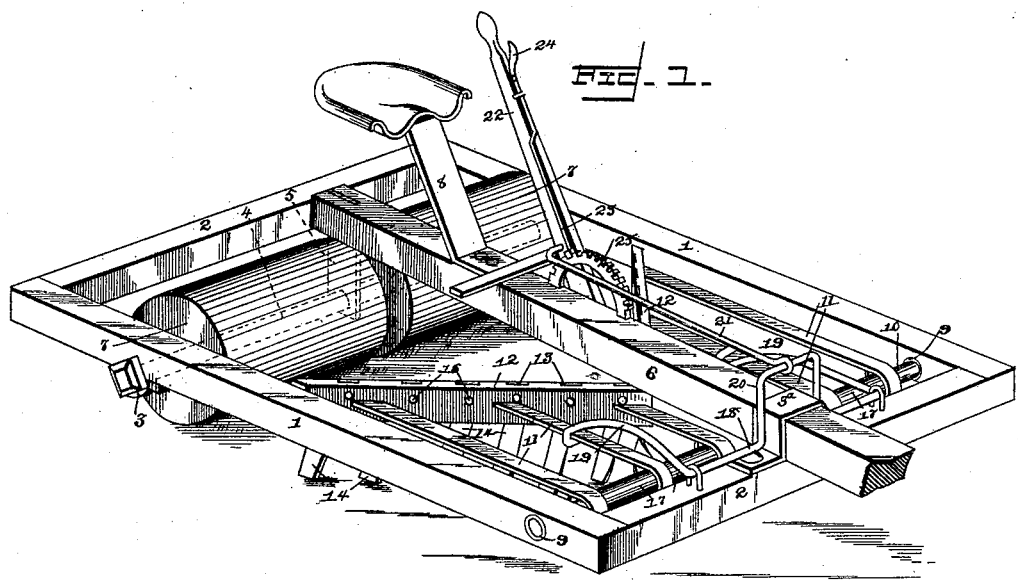
Witnesses:	Inventor
John F. Thompson.
By his Attorneys, (No Model.) 2 Sheets—Sheet 2.
J. F. THOMPSON.
AGRICULTURAL MACHINE.
No. 483,026. Patented Sept. 20, 1892.
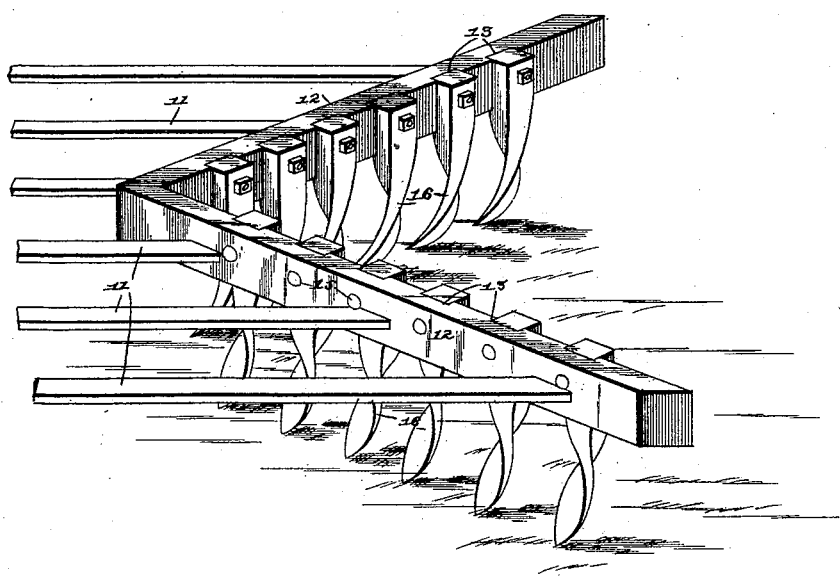
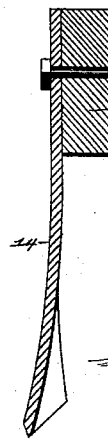
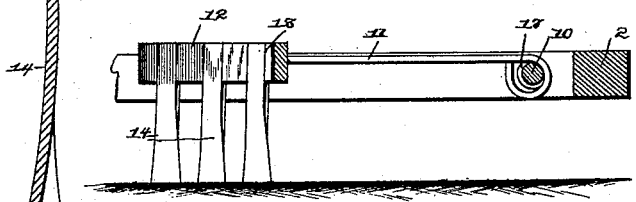
Witnesses:
E. S. Duvall Jr.
W. S. Duvall.
Inventor
John F. Thompson.
By his Attorneys,
C. A. Snow & Co.

UNITED STATES PATENT OFFICE.

JOHN F. THOMPSON, OF FULTON, KENTUCKY.

AGRICULTURAL MACHINE.

SPECIFICATION forming part of Letters Patent No. 483,026, dated September 20, 1892.

Application filed April 11, 1891. Renewed May 21, 1892. Serial No. 433,807. (No model.)

*To all whom it may concern:*

Be it known that I, JOHN F. THOMPSON, a citizen of the United States, residing at Fulton, in the county of Fulton and State of Kentucky, have invented a new and useful Agricultural Machine, of which the following is a specification.

This invention relates to improvements in agricultural machines; and the objects in view are to provide such a machine combining in its make-up all the requisites of a harrow, cultivator, and roller, the latter being adapted for use either independent of or in conjunction with either of the former two.

Other objects and advantages of the invention will appear in the following description, and the novel features thereof will be particularly pointed out in the claims.

Referring to the drawings, Figure 1 is a perspective view of a combined harrow and roller. Fig. 2 is a perspective of harrow-frame with cultivator-blades attached. Fig. 3 is a transverse section through the axle, the wheels for transporting the machine and for use in connection with the cultivators being mounted thereon. Fig. 4 is a transverse section through one of the harrow bars and teeth. Fig. 5 is a partial longitudinal section to show how the harrow is connected to the rock-shaft.

Like numerals of reference indicate like parts in all the figures of the drawings.

In practicing my invention I employ opposite longitudinal side bars 1 and transverse connecting end bars 2, the four bars combining to constitute a rectangular framework. Bearings 3 are located upon the under sides of the side bars 1, near the rear ends thereof, and in said bearings there is mounted a transverse fixed axle 4. A standard 5 rises from the center of the axle and supports the rear end of a draft-beam 6, the beam being secured to the front transverse bar 2 by a metal clip 3 and provided with the usual draft appliances. The axle 4 is also provided at each side of the standard 5 with loose rollers 7, employed as hereinafter mentioned. Upon the draft-beam, near the rear end, is a standard 8, upon which a seat for the driver is mounted.

In bearings 9 in the side bars 1, near the front end of the framework, is a transverse shaft 10, mounted rigidly in position and embraced at intervals by a series of rearwardly-disposed arms 11, which are graduated in length toward the center of the series. The arms 11 at each side of the draft-beam compose a separate group, and to each group is connected a diagonal harrow-bar 12, the two bars being disposed at a right angle to each other and having their inner ends substantially meeting or converged toward the front of the framework.

The harrow-bars are provided with gains 13, into which are let the upper ends or shanks of suitable harrow-teeth 14. In uncultivated ground—that is, where the same is lumpy—I employ, preferably, the twisted tooth, terminating at its lower edge in a cutting end, or where the ground is loamy and well pulverized I use a flat tooth. Whichever style of tooth is used the same is held in position, preferably, by a screw 15. It will of course be obvious, as I have illustrated in Fig. 2, that cultivator-teeth 16 may be substituted for the harrow-teeth, and said cultivator-teeth may be of a style and number desired. In order that the arms 11 may retain their relative positions upon the shaft 10, spacing-sleeves 17 are interposed between the arms.

In bearing-eyes located upon the front crossbar there is journaled a rock-shaft 18, said rock-shaft having spring-arms 19 located at its ends and bent at a right angle to the shaft to engage with arms 11 of the opposite harrow-sections. The rock-shaft is cranked at its center, so as to straddle the draft-beam, as at 20, and connected to the same is the front end of a connecting-bar 21, the rear end of which engages with a pivoted hand-lever 22, located at one side of the draft-beam and within reach of the driver when perched upon his seat. The lever 22 is provided with a spring-pawl 23 and a lever 24 for operating the same, said pawl being designed for engagement with the toothed sector 25, secured to the draft-beam.

In operation the harrow works the soil or pulverizes it in the usual manner, which pulverization is followed by the crushing force of the rollers, which crush all clods and leave the land finely pulverized and prepared for planting. By operating the lever 22 it will be obvious that the harrow-teeth may be depressed, so as to take deeper into the soil, or elevated to a desired degree and also raised above the soil to avoid such objects as stumps of trees, stones, &c., liable to injure the teeth. The cultivator-teeth are used in much the same way—namely, by manipulating the lever 22 they may be depressed with greater or less force or wholly elevated, and in the event of any one of the same contacting with an unyielding object calculated to break the teeth the spring-arms of the rock-shaft, which are curved, will readily yield to such force, and thus the teeth be sprung over the object.

The rollers may or may not be employed in connection with the harrow-teeth or the cultivator-teeth and are also dispensed with when transporting the machine to the place of use. In such instances as when the rollers are not employed I provide a pair of ground-wheels 26, which I mount upon the fixed axle 4, near the side bars 1, and, as shown in Fig. 3, employ spacing-sleeves 27 for maintaining the wheels in position, and also the vertical standard 5.

From the above construction it will be obvious that I have invented an agricultural machine combining in its make-up several distinct and conjunctive elements, all as will be apparent from the above description, taken in connection with the accompanying drawings.

Having described my invention, what I claim is—

1. The combination, with the rectangular framework, the harrow-sections, and the rear axle, of the standard rising from the axle, the draft-beam connected at its rear end to the standard and secured to the front cross-bar of the frame, a pair of ground-wheels mounted removably on the axle, and a series of interposed sleeves mounted on the axle between the wheels and standard, substantially as specified.

2. In an agricultural machine, the combination, with the rectangular framework, the transverse shaft located at the front end thereof, the series of graduated arms loosely mounted on the shaft, and the teeth-carrying heads connected to the arms and independent of each other, of the centrally-cranked rock-shaft journaled in bearings in the front end of the framework and terminating beyond the bearings at its ends in curved spring-arms connected to the graduated arms, the pivoted operating-lever, and the rod connecting the same with the crank of the rock-shaft, substantially as specified.

In testimony that I claim the foregoing as my own I have hereto affixed my signature in presence of two witnesses.

JOHN F. THOMPSON.

Witnesses:
Q. ED. THOMAS,
W. H. PHIPPS.